United States Patent
Smith

(10) Patent No.: US 6,622,614 B1
(45) Date of Patent: Sep. 23, 2003

(54) INTEGRATED CONTAINER AND INFUSER APPARATUS

(75) Inventor: Steven D. Smith, Portland, OR (US)

(73) Assignee: Tazo Tea Company, Portland, OR (US)

( * ) Notice: Subject to any disclaimer, the term of this patent is extended or adjusted under 35 U.S.C. 154(b) by 17 days.

(21) Appl. No.: 09/670,470

(22) Filed: Sep. 26, 2000

(51) Int. Cl.[7] ............ A47B 19/16; A47J 31/18
(52) U.S. Cl. ............ 99/284; 99/290; 99/306; 426/77; 426/112; 426/433; 426/435
(58) Field of Search ............ 426/77, 112, 433, 426/435, 86; 99/284, 290, 306, 318, 322, 323

(56) References Cited

U.S. PATENT DOCUMENTS

| | | | | |
|---|---|---|---|---|
| 895,347 A | * | 8/1908 | Desprez | 99/306 |
| 1,347,142 A | * | 7/1920 | Biette | 99/284 |
| 1,549,043 A | * | 8/1925 | Meyer | 99/284 |
| 1,681,656 A | * | 8/1928 | Biette | 99/306 |
| 1,740,136 A | * | 12/1929 | Aborn | 99/284 |
| 1,743,925 A | * | 1/1930 | Krause | 99/306 |
| 1,872,466 A | * | 8/1932 | Krause | 99/306 |
| 2,543,581 A | * | 2/1951 | Koski | 99/284 |
| 2,577,200 A | * | 12/1951 | Krause | 99/306 |
| 2,743,664 A | * | 5/1956 | Dale | 426/86 |
| 3,139,344 A | * | 6/1964 | Weisman | 426/433 |
| 3,166,003 A | * | 1/1965 | Merson | 426/433 |
| 3,695,167 A | * | 10/1972 | Schmidt et al. | 426/77 |
| 3,912,118 A | | 10/1975 | Bird | |
| 3,915,296 A | * | 10/1975 | Spencer | 426/86 |
| 3,971,305 A | * | 7/1976 | Daswick | 426/77 |
| 4,070,955 A | * | 1/1978 | Braun | 99/284 |
| 4,348,421 A | * | 9/1982 | Sakakibara et al. | 426/112 |
| 4,417,504 A | | 11/1983 | Yamamoto | |
| 4,522,298 A | * | 6/1985 | Weinberger | 426/112 |
| 4,627,334 A | * | 12/1986 | Shanklin | 426/77 |
| 4,715,271 A | * | 12/1987 | Kitagawa | 426/112 |
| 4,981,588 A | * | 1/1991 | Poulallion | 426/77 |
| 4,988,019 A | | 1/1991 | Dawes | |
| 5,036,755 A | * | 8/1991 | Abdenour | 99/306 |
| 5,072,661 A | * | 12/1991 | Kondo | 426/433 |
| 5,132,124 A | * | 7/1992 | Tamaki et al. | 426/112 |
| 5,168,140 A | | 12/1992 | Welker | |
| 5,775,205 A | | 7/1998 | Melton | |
| 5,913,964 A | | 6/1999 | Melton | |
| 5,947,004 A | | 9/1999 | Huang | |
| 6,065,609 A | * | 5/2000 | Lake | 99/306 |

FOREIGN PATENT DOCUMENTS

| | | | | |
|---|---|---|---|---|
| FR | 554252 | * | 7/1922 | 99/322 |
| GB | 2174890 | * | 11/1986 | 426/86 |

* cited by examiner

Primary Examiner—Steve Weinstein
(74) Attorney, Agent, or Firm—Christensen O'Connor Johnson Kindness PLLC

(57) ABSTRACT

The present invention is a convenient, aesthetically pleasing, multi-purpose container/beverage infuser that allows a user to store and brew beverages such as tea. The device includes a base container for storing the loose tea leaves prior to brewing. A lid is provided to seal the container so that the tea leaves may be preserved during storage. An infuser is removably attached to the base container. The infuser is shaped so that that it may be inverted over a drinking container and receive a predetermined amount of fresh tea leaves to be steeped. Clips are coupled to the infuser so that the infuser may be retained in the inverted position over the drinking container during the brewing process. A cap is placed on top of the infuser when assembled and may be invertedly placed on a stable surface to hold the infuser after use to prevent excess dripping.

6 Claims, 7 Drawing Sheets

INTEGRATED CONTAINER AND INFUSER APPARATUS

FIELD OF THE INVENTION

The present invention relates generally to the storage and brewing of beverages, and more particularly to a integrated container and infuser apparatus for storing and brewing teas and other steeped beverages.

BACKGROUND OF THE INVENTION

In recent years, there has been an evolving interest in the so-called gourmet beverage industry. Consumption of these beverages has increased, along with a demand for the highest quality, and best tasting beverages available. Moreover, the demand has created the desire for a large selection of flavors. The popularity of gourmet beverage shops and cafes have developed the need for the availability of equivalent quality beverages at home. One such gourmet beverage for home consumption is tea and/or herbal tea. To brew the highest quality teas, the highest quality tea leaves must be used which are typically sold as loose, full leaves.

Typical home brewing devices make an entire pot at once for multiple servings. These devices are impractical for the consumer who wants only a single serving. The advent of the tea bag addressed this need for a device to brew a single serving. However, tea bags have several drawbacks such as they use lower quality tea leaves, and the consumer is limited to the flavors and types of teas that are available in the tea bag format. Further, brewing methods affect the quality of the brewed tea. Steeping, or the process of extracting the flavor of tea by soaking the leaves in near-boiling water, has been recognized as the best method for brewing teas using loose, full leaves.

To brew the best quality tea, several tea infusers have been presented so that the highest quality tea leaves and the best brewing method can be used. Conventional tea infusers typically are circularly shaped strainers with a central recessed portion placed within the opening of a drinking container. The recessed portion contains several apertures and extends into the cavity of the drinking container. Loose tea leaves are placed in the central recessed portion over which near boiling fluid, such as water, is poured. As the fluid passes over the leaves and through the apertures into the drinking container, flavor is extracted. Flavor is further extracted from the tea leaves by allowing the near-boiling water to rise to fill the central portion of the infuser. The tea leaves are allowed to steep in the near boiling water for a predetermined amount of time. Once the desired strength of the tea is reached, the leaves and/or the infuser is removed from the drinking container.

Several prior art devices include a serving container such as a cup coupled with an infuser lid to provide a convenient method of brewing a single serving of tea. Such prior art infusers are shown and described in U.S. Pat. No. 5,775,205 to Melton and U.S Pat. No. 5,947,004 to Huang. However, there has not been a multi-purpose device that stores tea leaves and provides an infuser for brewing when used with an associated drinking container encompassed in a simply assembled, aesthetically pleasing package.

SUMMARY OF THE INVENTION

The present invention provides a convenient, aesthetically pleasing, multi-purpose container/beverage infuser that allows a user to store and brew beverages such as tea. The device includes a base container for storing the loose tea leaves prior to brewing. A lid is provided to seal the container so that the tea leaves may be preserved during storage. An infuser is removably attached to the base container. The infuser is shaped so that that it may be inverted over a drinking container and receive a predetermined amount of fresh tea leaves to be steeped. Clips are coupled to the infuser so that the infuser may be retained in the inverted position over drinking containers of various dimensions during the brewing process. A cap is placed on top of the infuser when assembled and is designed to be placed on a stable surface to hold the infuser after use as a drip cap to prevent excess dripping.

In accordance with the first aspect of the present invention, the integrated infusible substrate container and infuser apparatus comprises a container having an interior cavity for holding an infusible substrate prior to infusion and an infuser in removable association with the container. The infuser includes a well portion for receiving the infusible substrate, and further includes a plurality of apertures for permitting infusion of the infusible substrate.

In accordance with another aspect of the present invention, a method of using an integrated container and infuser apparatus is provided. In accordance with the method, a user removes the infuser from the container. The user obtains an amount of infusible substrate from the container and places the amount of infusible substrate in the well portion. The user places the infuser within an opening of an associated drinking container and pours water through the infuser to extract flavors from the infusible substrate.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
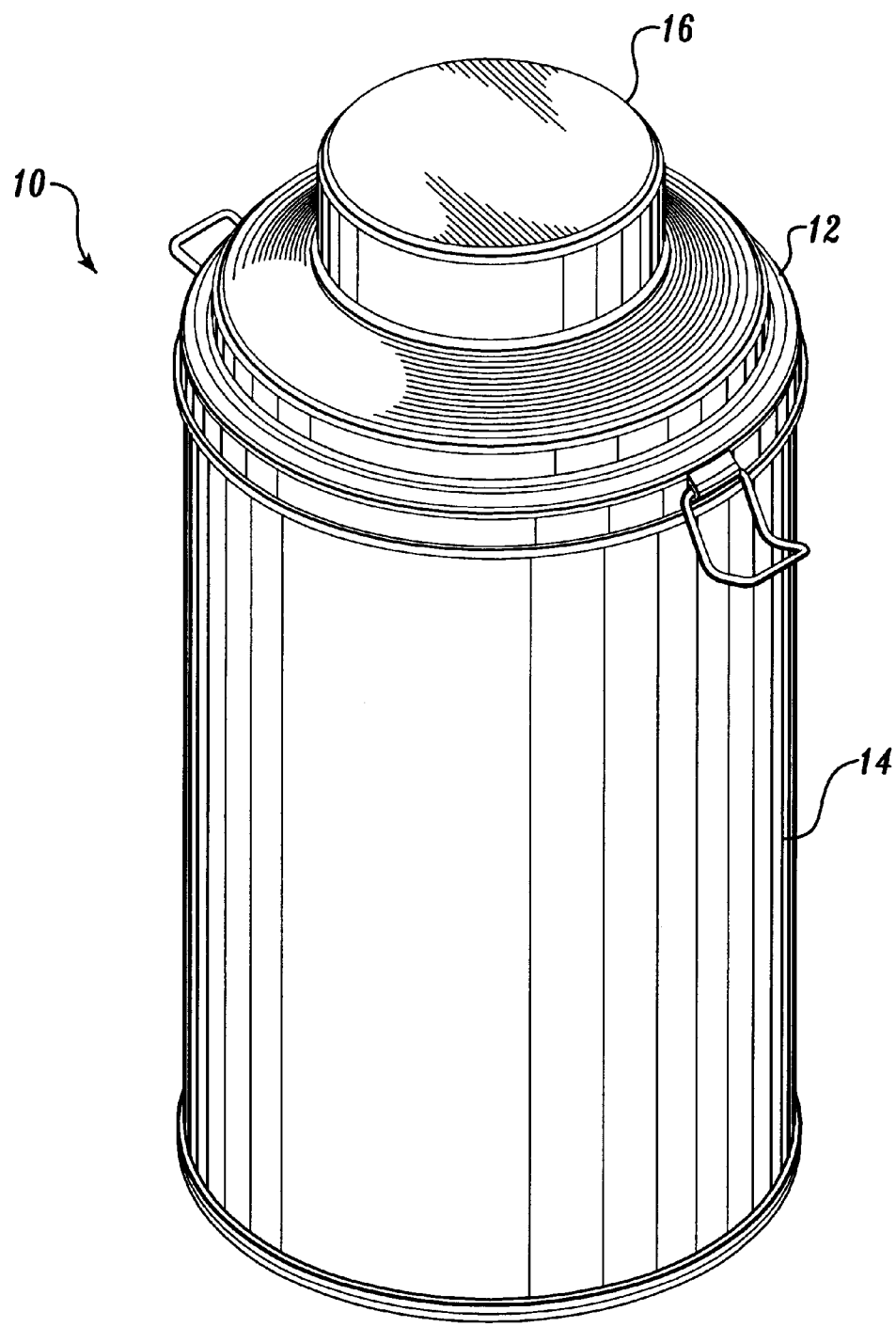
FIG. 1 illustrates a perspective view of a representative embodiment of the integrated container and infuser apparatus of the present invention.
Figure 2:
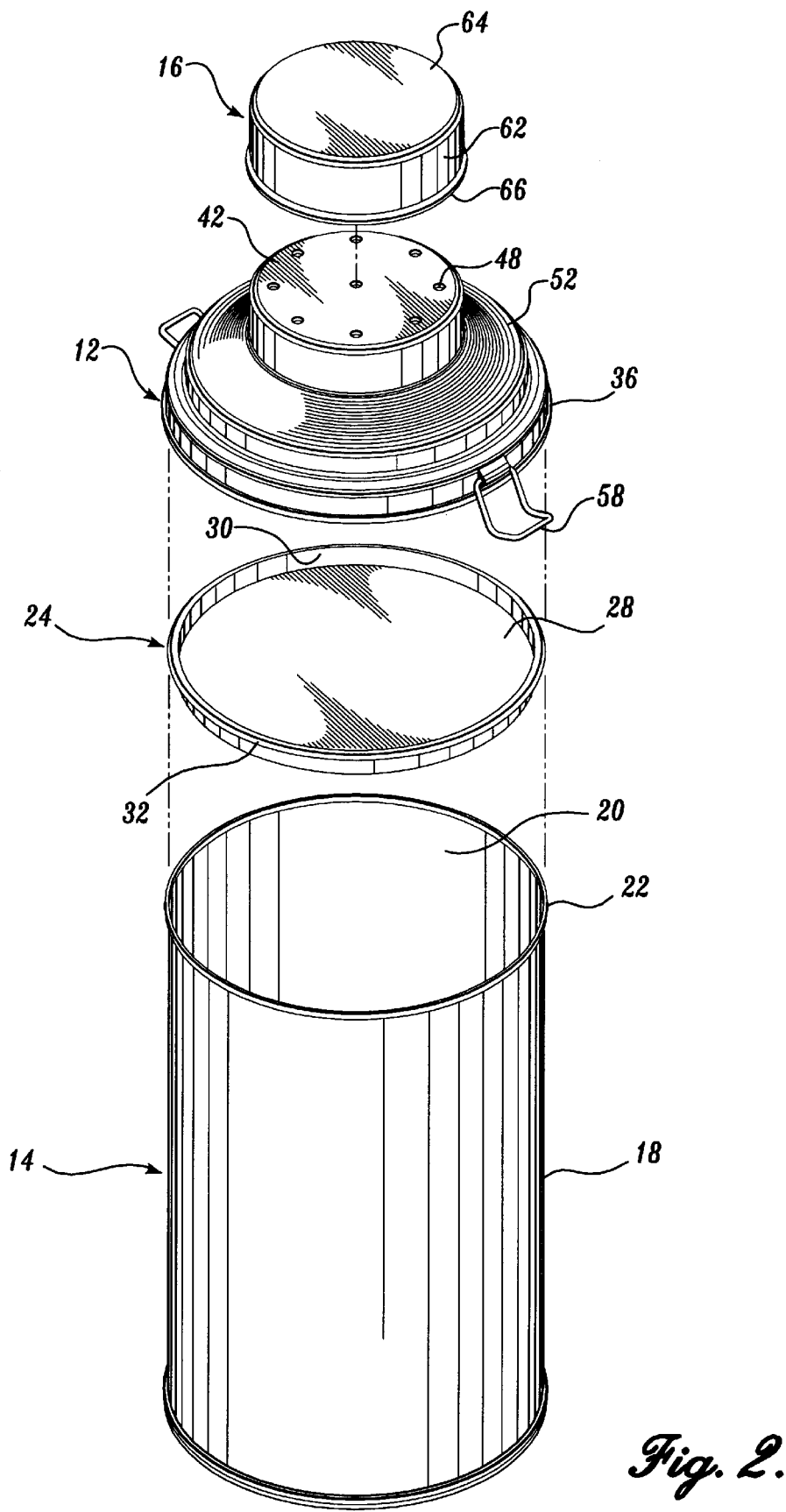
FIG. 2 illustrates an exploded perspective view of the representative embodiment of FIG. 1.
Figure 3:
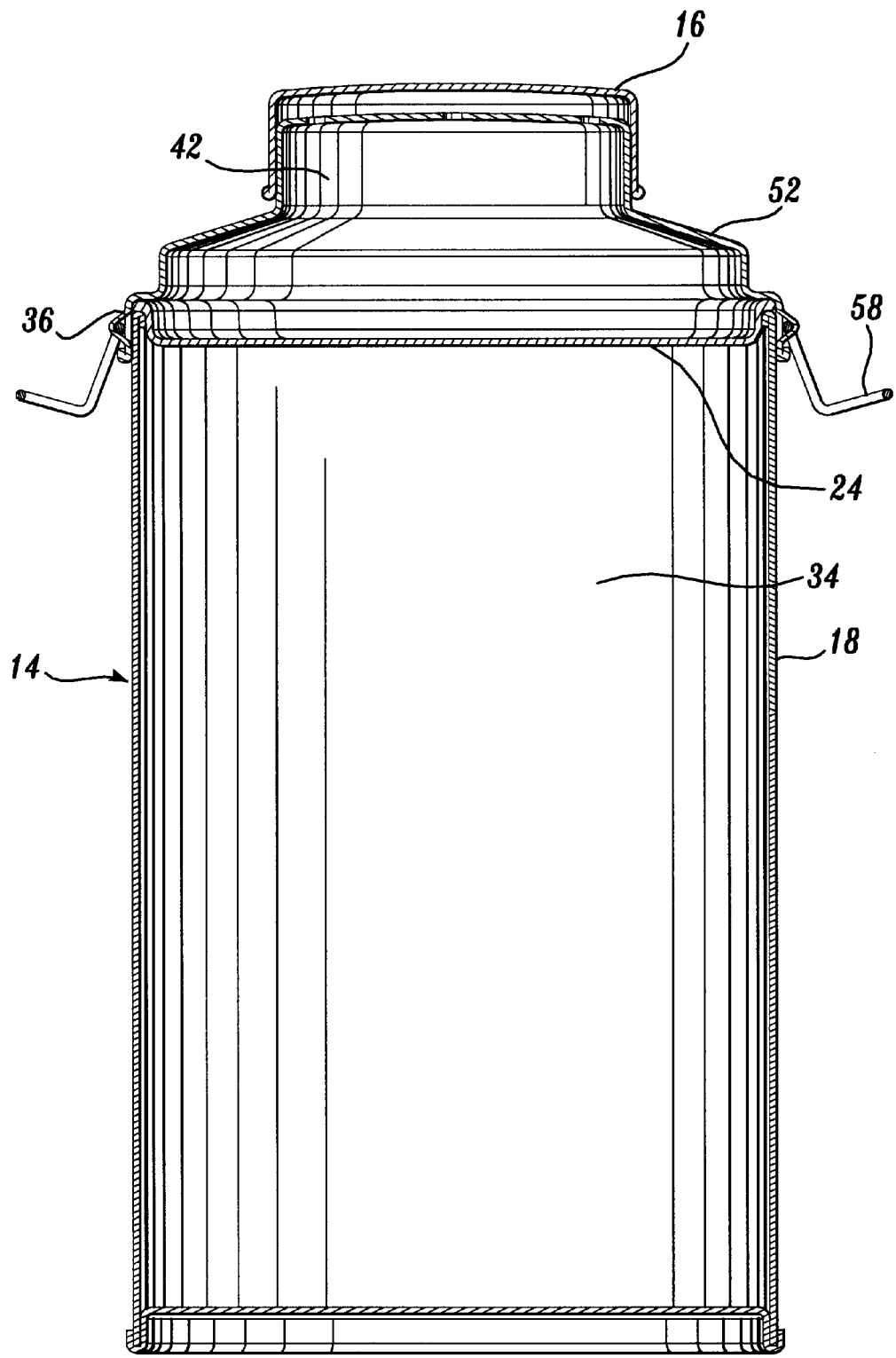
FIG. 3 illustrates a cross-sectional view of the container and infuser apparatus shown in FIG. 1.

The present invention will now be described with reference to the accompanying drawings. Referring generally to FIG. 1 a representative embodiment of the combination integrated container and infuser 10 is shown. As shown in FIG. 2, the integrated container and infuser 10 is comprised of an infuser lid 12 removably attached to a cylindrically shaped container 14 and a removable cap 16. The container 14 for storing tea or other infusible substrate has a rounded side wall portion 18, an open top 20 having a rolled, inwardly turned rim section 22, and a container lid 24. The lid 24 is defined by a depressed center section 28 connected in a transverse manner to an upwardly extending side wall section 30 that wraps around the outer periphery thereof. Attached to the side wall section 30 in a downwardly extending manner radially outward of the center section 28 is a lip section 32. Lip section 32 extends around the outer peripheral surface of the lid 24 in the form of a roll or curl to form an annular surface that is engageable with the rim section 22 of the container 14. As shown in FIG. 3, the lid 24 may be placed and seated within the open top 20 of the container 14 to form a fluid tight cavity 34 to store tea leaves or other infusible substrate.

Figure 4:
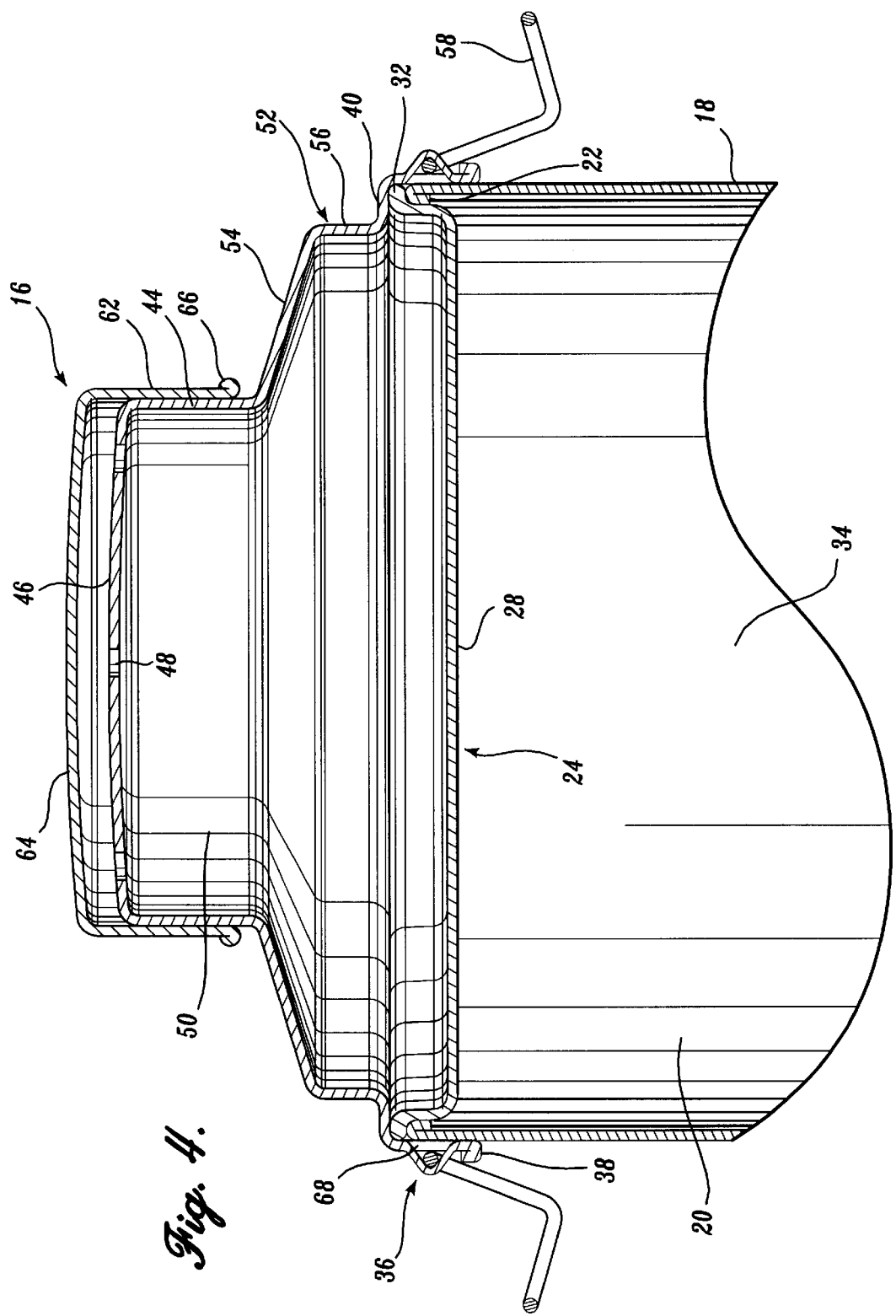
FIG. 4 illustrates an enlarged cross-sectional view of the container and infuser apparatus shown in FIG. 1.

Referring to FIGS. 2–4, in a representative embodiment of the present invention, the infuser lid 12 forms a well portion for receiving and containing an infusible substrate during infusion. The infuser lid 12 is removably attached to the open top 20 of the container 14 and contains a first section, generally designated as an outer peripheral flange 36. The bottom portion of outer peripheral flange 36 terminates in a rolled, outwardly turned rim section 38. The outer peripheral flange 36 being of sufficient diameter to allow the infuser lid 12 to seat over the upper portion of the sidewall portions 18 of container 14 while the rim section 22 of the container 14 engages a shelf section 40 of the infuser lid 12 described below. The rim section 38 of outer peripheral flange 36 is spaced sufficiently radially outward from the container 14 to allow fingers to be placed thereunder during removal of the infuser 12 from the container 14.

As shown in FIGS. 2–4, the infuser lid 12 further comprises a second section, generally designated as a centrally located annular protruding portion 42. The protruding portion 42 is defined by a downwardly depending sidewall 44 spaced radially inward from the outer peripheral flange 36 of infuser lid 12. The protruding portion 42 is further defined by a flat, top wall 46 having a plurality of apertures 48 providing fluid communication through the infuser lid 12. When inverted, the protruding portion 42 forms a chamber or well 50 for holding tea leaves or other infusible beverage substrate.

Referring to FIGS. 2–4, the infuser lid 12 further contains a third section, generally designated as a middle section 52 located between the outer peripheral flange 36 and the protruding portion 42. The middle section 52 begins at the bottom of sidewall 44 and extends downwardly in a tapered or domed manner radially outward of sidewall 44 to form a frustoconical surface 54. At a position radially inward of outer peripheral flange 36 but radially outward from sidewall 44, the middle section 52 extends downwardly from surface 54 to form a cylindrical sidewall 56. The middle section 52 extends outwardly at the bottom of cylindrical sidewall 56 to extend in a direction transverse to cylindrical sidewall 56 to form the annular shelf or shoulder section 40. The middle section 52 ends at the top of outer peripheral flange 36.

Figure 5:
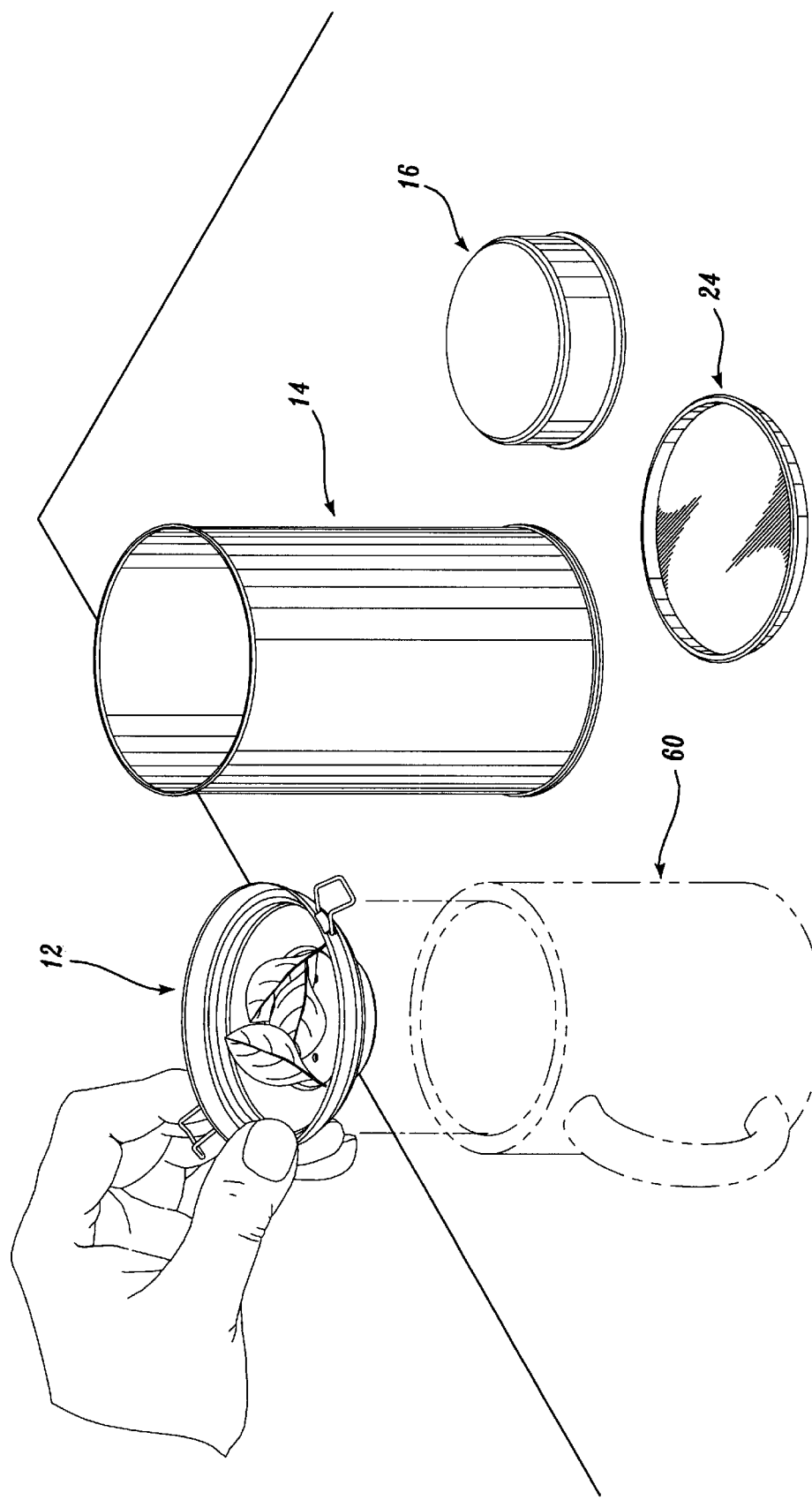
FIG. 5 illustrates an environmental depiction of the container and infuser apparatus.

Still referring to FIGS. 2–4, pivotally attached to the outer peripheral flange 36 are two or more oppositely opposed hinged clips 58 for retaining the infuser on top of a cup or drinking container 60 (FIG. 5). In the embodiment shown in FIG. 4, the clips 58 are formed in an L-shaped cross-section. The ends of clips 58 extend within a slot 68 formed in the outer flange 36. The clips 58 are shaped so that they extend outwardly far enough to engage the outer rim of the cup or drinking container 60 as shown in FIG. 5.

As shown in FIGS. 3 and 4, the apparatus of the invention may be further provided with a cap 16 that is removably attachable to the protruding portion of infuser lid 12. The cap 16 is defined by a downwardly depending sidewall section 62 and a flat top wall 64, both of which are congruent to sidewall 44 and top wall 46, respectively, of protruding portion 42. The bottom edge of sidewall section 62 terminates in a rolled, outwardly turned rim section 66. The cap 16 is formed with a diameter sufficient to create a snug seating engagement when the cap 16 is placed over the protruding section 42 of infuser lid 12.

Figure 6:
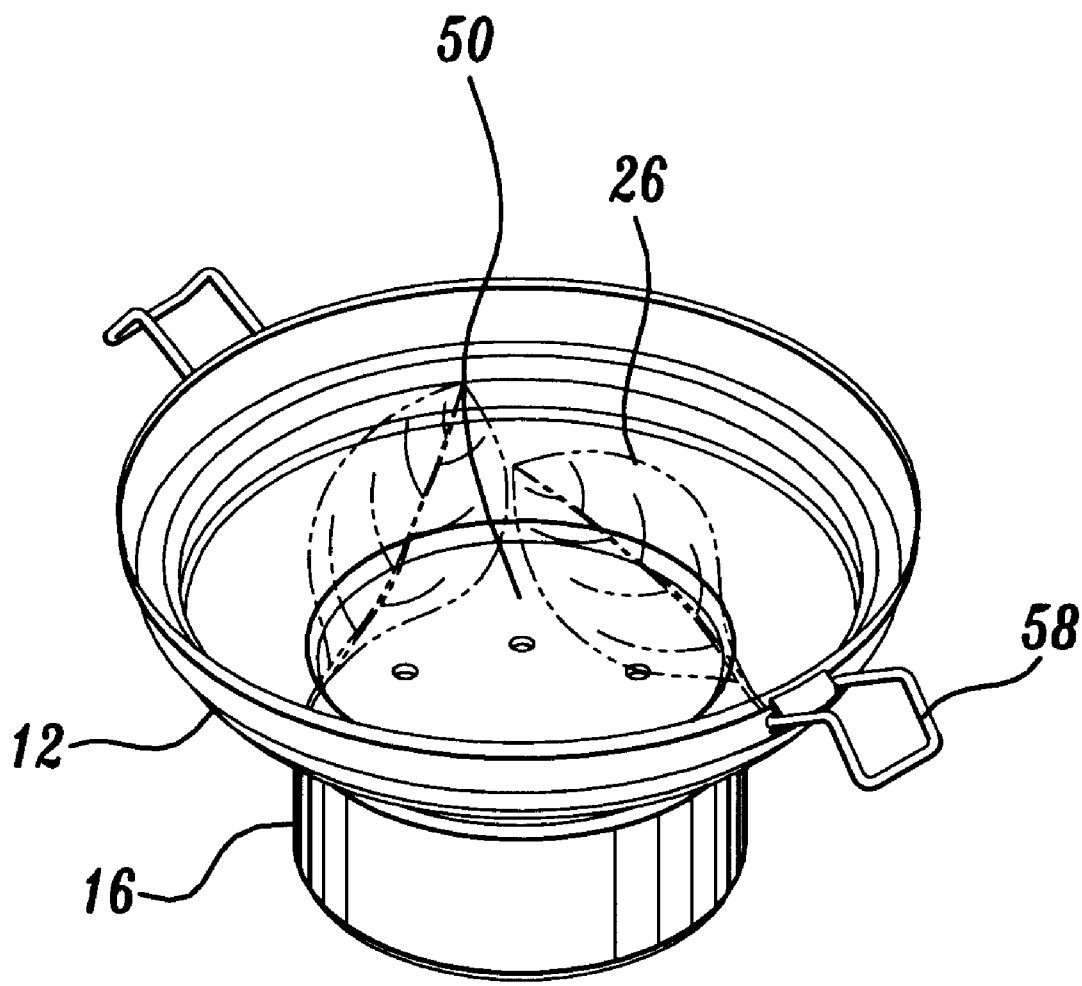
FIG. 6 illustrates a perspective view depicting an infuser placed into a cap prior to or after infusion.

While it will be understood that the of the present invention may be utilized in different ways, a description will now be given of the presently preferred usage of the integrated container and infuser 10. As best shown in FIG. 5, the cap 16 and infuser lid 12 are detached from the container 14. The infuser lid 12 is separated from the cap 16 and inverted over a drinking container 60. It should be appreciated that the cap 16 can be separated from the infuser 12 prior to or after the detachment of the infuser lid 12. The infuser lid 12 is lowered into the open cavity of the drinking container 60 in an inverted manner until the retaining clips 58 engage the outer rim of the drinking container 60 thereby coupling the infuser lid 12 thereto. The container lid 24 is removed from the container 14 to expose the loose tea or other infusible substrate 26. It will be appreciated that the lid 24 may be removed prior to the infuser lid 12 being inverted and coupled to the drinking container 60. A desired amount of loose tea leaves or other infusible substrate 26 is removed from the container 14 and placed in the chamber or well 50 of the infuser lid 12. This may be done before or after the infuser lid 12 is coupled to the drinking container 60. Near boiling fluid such as water is then poured over the tea leaves 26 in the chamber 50 until the fluid level in the chamber or well 50 reaches an appropriate level such that substantially all of the tea leaves or other infusible substrate 26 is fully submerged into the fluid. After allowing the tea leaves 26 to steep for a desired amount of time, the infuser lid 12 is removed from the drinking container 60. The infuser lid 12 may be placed in the inverted position into the cap 16, as shown in FIG. 6, to prevent excess fluid from dripping. After use, the container lid 24 may be placed back on the container 14 to seal the container 14 and preserve the loose tea leaves 26 for later use. The infuser lid 12 may be reinverted and placed on top of the container 14. The cap 16 may then be placed on top of the protruding portion 42 of the infuser lid 12 for storage.

Alternatively, the tea may be steeped by having the fluid in the associated drinking container 60 reach an appropriate level such that the protruding portion 42 of the infuser lid 12 is submerged in the fluid. Once the tea has reached the desired flavor, the infuser lid 12 is removed from the drinking container 60.

Figure 7:
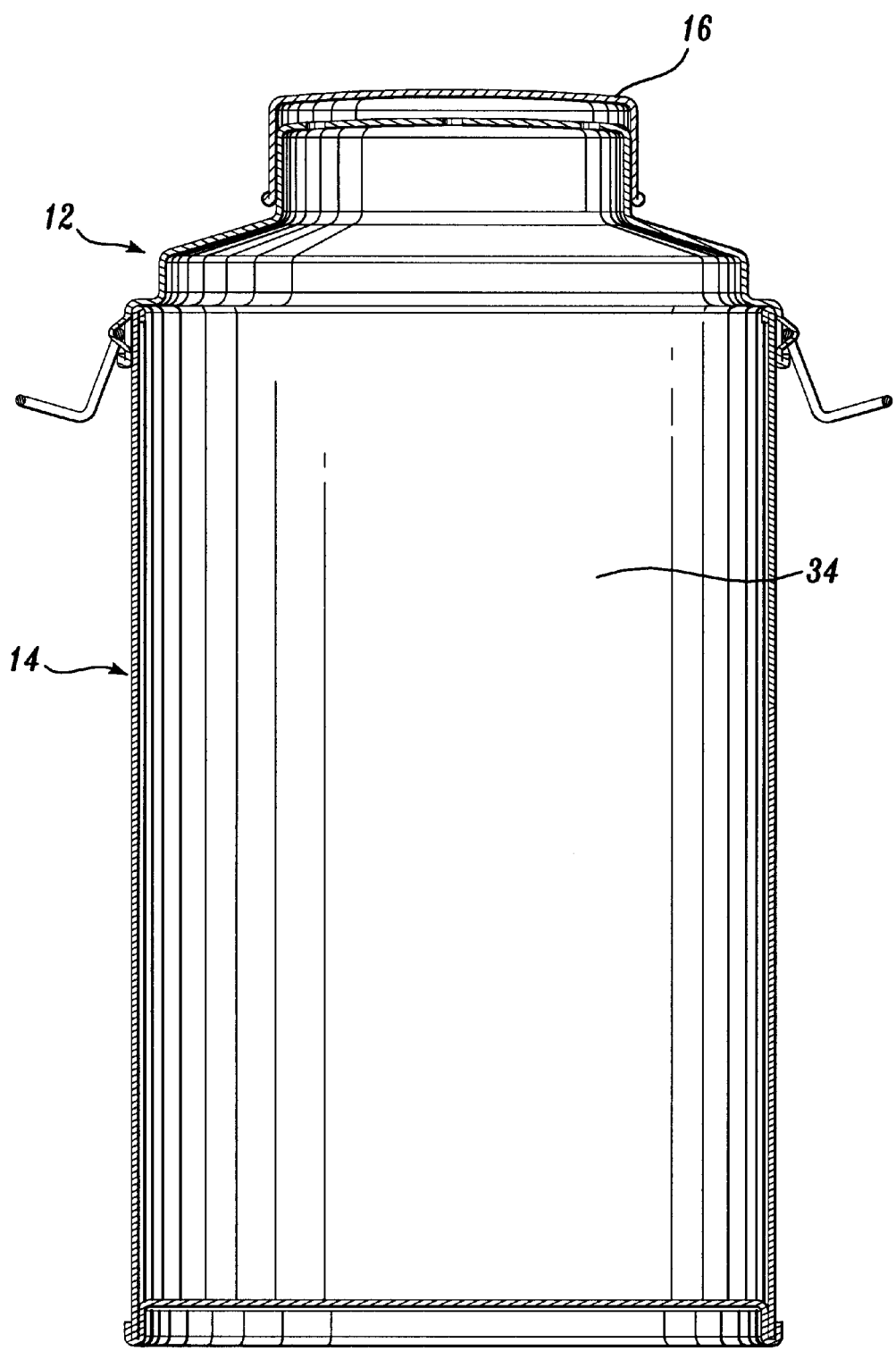
FIG. 7 illustrates a cross-sectional view of another representative embodiment of the integrated container and infuser apparatus of the present invention.

In an alternative embodiment of the present invention, as shown in FIG. 7, the container lid 24 may be omitted and the cap 16 may serve an additional function of sealing the infuser lid 12 and the container 14 to create a sealed cavity 34 for preserving the loose tea leaves.

While the preferred embodiment of the invention has been illustrated and described, it will be appreciated that various changes can be made therein without departing from the spirit and scope of the invention. For example, the infuser lid 12 may be of sufficient diameter such that retaining clips 58 are not necessary for coupling the infuser lid 12 with the drinking container 60. The inverted infuser lid 12 would rest on the drinking container 60 by having the annular shelf section 40 engage the outer rim thereof.

The embodiments of the invention in which an exclusive property or privilege is claimed are defined as follows:

1. A combination container and infuser apparatus for storing infusible substrate and brewing said infusible substrate in a separate drinking container comprising:

an infusible substrate storage container having a sealable interior cavity for storing an infusible substrate prior to infusion and a top opening defined by rim section for providing access to the infusible substrate stored in said container;

a lid adapted to be seated in said top opening of said container to form a fluid tight seal with said rim section to seal the storage container so that the infusible substrate may be preserved during storage; and an infuser having an other peripheral flange configured and dimensioned to be seated over said lid of said container for removable attachment to said container in a first storage position, said infuser having a protruding well portion away from said lid in said first storage position and adapted for receiving a portion of the infusible substrate when said infuser is removed from said container and inverted to a second infusion position, said well portion having a plurality of apertures for permitting infusion of the infusible substrate, said infuser further having means for retaining said infuser in said inverted second infusion position on top of said separate drinking container during infusion by said retaining means engaging the outer rim of said drinking container such that said protruding well portion extends into opening of the drinking container a sufficient distance to permit infusion of infusible substrate in said protruding well with liquid added in the separate drinking container.

2. The apparatus of claim 1, further comprising a cap in removable association with said infuser.

3. The apparatus of claim 2, wherein said cap provides a temporary holding place for said infuser.

4. The apparatus of claim 1, wherein said means for retaining said infuser in said inverted second infusion position on top of said separate drinking container includes at least two retaining clips.

5. The apparatus of claim 4, wherein said retaining clips are coupled to said outer peripheral flange of said infuser.

6. The apparatus of claim 1, wherein said means for retaining said infuser in said inverted second infusion position on top of said separate drinking container includes a shoulder portion defined by said outer peripheral flange.

* * * * *

UNITED STATES PATENT AND TRADEMARK OFFICE
CERTIFICATE OF CORRECTION

PATENT NO.     : 6,622,614 B1
DATED          : September 23, 2003
INVENTOR(S)    : S.D. Smith It is certified that error appears in the above-identified patent and that said Letters Patent is hereby corrected as shown below:

<u>Column 5,</u>
Line 6, "by rim section" should read -- by a rim section --
Line 13, "an other" should read -- an outer --
Line 17, "well portion away" should read -- well portion protruding away --

<u>Column 6,</u>
Line 5, "into opening" should read -- into the opening --

Signed and Sealed this

Twenty-fifth Day of May, 2004

JON W. DUDAS
*Acting Director of the United States Patent and Trademark Office*